(12) United States Patent
Xue et al.

(10) Patent No.: US 7,397,633 B2
(45) Date of Patent: Jul. 8, 2008

(54) WRITER STRUCTURE WITH ASSISTED BIAS

(75) Inventors: Song Sheng Xue, Eden Prairie, MN (US); Mark Thomas Kief, Lakeville, MN (US); Johannes van Ek, Minnetonka, MN (US); Nural Amin, Woodbury, MN (US); Olle Gunner Heinonen, Eden Prairie, MN (US); Kaizhong Gao, Eden Prairie, MN (US); Patrick Joseph Ryan, St. Paul, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 420 days.

(21) Appl. No.: 11/069,792

(22) Filed: Mar. 1, 2005

(65) Prior Publication Data

US 2006/0198047 A1    Sep. 7, 2006

(51) Int. Cl.
*G11B 5/127*   (2006.01)
*G11B 5/187*   (2006.01)

(52) U.S. Cl. .................. 360/125.3; 360/125.03; 360/125.13; 360/125.71

(58) Field of Classification Search .............. 360/126, 360/125.3, 125.03, 125.13, 125.71
See application file for complete search history.

(56) References Cited

U.S. PATENT DOCUMENTS

| | | | |
|---|---|---|---|
| 4,935,832 A * | 6/1990 | Das et al. ............... 360/112 |
| 5,695,864 A | 12/1997 | Slonczewski ............. 428/212 |
| 5,910,870 A * | 6/1999 | Ishiwata .................. 360/317 |
| 6,512,661 B1 | 1/2003 | Louis ..................... 360/324.12 |
| 6,621,664 B1 | 9/2003 | Trindade et al. ......... 360/318 |
| 6,667,861 B2 | 12/2003 | Gill ....................... 360/324.11 |
| 6,807,031 B2 * | 10/2004 | Macken et al. .......... 360/317 |
| 6,954,340 B2 * | 10/2005 | Shukh et al. ............ 360/317 |
| 7,070,716 B2 * | 7/2006 | Lam ....................... 360/126 |
| 7,072,142 B2 * | 7/2006 | Lam ....................... 360/126 |
| 7,199,975 B1 * | 4/2007 | Pan ....................... 360/126 |
| 2002/0135935 A1 * | 9/2002 | Covington .............. 360/126 |
| 2003/0039079 A1 | 2/2003 | Zheng et al. ............ 360/324.1 |
| 2004/0021985 A1 | 2/2004 | Pokhil et al. ........... 360/126 |
| 2004/0085683 A1 | 5/2004 | Lin et al. ............... 360/314 |
| 2005/0013044 A1 * | 1/2005 | Hirata et al. ........... 360/125 |
| 2005/0111137 A1 * | 5/2005 | Ju et al. .................. 360/126 |
| 2006/0002020 A1 * | 1/2006 | Pokhil et al. ........... 360/126 |

OTHER PUBLICATIONS

U.S. Appl. No. 10/650,302, filed Aug. 28, 2003, Kubota et al.
U.S. Appl. No. 10/897,447, filed Jun. 29, 2004, Seigler et al.

(Continued)

*Primary Examiner*—Jefferson Evans
(74) *Attorney, Agent, or Firm*—Westman, Champlin & Kelly, P.A.

(57) ABSTRACT

A recording head for use with a storage medium is provided. The recording head includes a substrate, a magnetic pole, a first magnetic bias structure positioned on a first side of the magnetic pole, and a second magnetic bias structure positioned on a second side of the magnetic pole, Spacer material is positioned between the magnetic pole and the first magnetic bias structure and between the magnetic pole and the second magnetic bias structure.

19 Claims, 19 Drawing Sheets

OTHER PUBLICATIONS

Richter et al., "Theoretical Analysis of Longitudinal and Perpendicular Recording Potential", TMRC 2002, pp. 1-7.

Encinas et al., "Contribution of Current Perpendicular to the Plane to the Giant Magnetoresistance of Laterally Modulated Spin Values", Dec. 1997, 1997, American Institute of Physics, pp. 3299-330.

Nagasaka et al., "CPP Operational Mode of GMR Head", Dec. 2001, Fujitsu Sci. Tech. J., 37, 2, pp. 192-200.

* cited by examiner

WRITER STRUCTURE WITH ASSISTED BIAS

BACKGROUND OF THE INVENTION

The present invention relates generally to the field of data storage and retrieval systems. More particularly, the present invention relates to assisting operation of a recording head.

In an electronic data storage and retrieval system, a transducing head can include a writer for storing information on a magnetic disc and a reader for retrieving the magnetically-encoded information from the magnetic disc. In a magnetic environment, the reader can include two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer portion can include a top and one or two return poles. The return poles are separated from the top pole at an air bearing surface of the writer by a gap layer, and which are connected to each other at a region distal from the air bearing surface by a back gap, and which are connected to each other at a region distal from the air bearing surface by a back gap closer or back via. Positioned between the top and return poles are one or more layers of conductive coils encapsulated by insulating layers. The writer portion and the reader portion are often arranged in a merged configuration in which a shared pole serves as both the top shield in the reader portion and a bottom pole in the writer portion.

To write data to the magnetic media, an electrical current is caused to flow through the conductive coils to thereby induce a magnetic field to emanate from the top pole. By reversing the polarity of the current through the coils, the polarity of the data written to the magnetic media is also reversed. The track width of the written data is defined by the width of the top pole near the write gap at the air bearing surface.

In a magnetic recording, it is desirable to improve the areal density at which information can be recorded and reliably read. Perpendicular recording designs have the potential to support higher areal densities on storage media due to the way magnetic transitions are stored on the media and because a larger write field can be generated than is the case in longitudinal recording. In perpendicular recording systems, the magnetic transitions are stored perpendicular to a surface of the disc, which ultimately utilizes less disc space. A perpendicular recording head can include a write pole, a leading return or opposing pole magnetically coupled to the write pole and/or a trailing return pole, and an electrically conductive magnetizing coil surrounding the write pole. When recording magnetic transitions on the media, current is passed through the coil to create a magnetic flux in the write pole. The magnetic flux passes through a hard magnetic layer to a soft under layer in the media and across to the opposing pole. The magnetic flux creates transitions on the media. Perpendicular pole tips and parts surrounding the pole tips can create large magnetic fields even in a state when the writing current is turned off, which is referred to as a remnant state. The magnetic field remaining in the pole tip can adversely effect the transitions on the media, which can cause erasure of bits on the media. A design to assist operation of the pole tip and also prevent extraneous magnetic fields from erasing bits on the media is thus desired.

SUMMARY OF THE INVENTION

The present invention relates to a recording head with a storage medium. The head includes a magnetic pole, a magnetic bias structure and a spacer positioned between the magnetic pole and the magnetic bias structure.

In another aspect of the present invention, a head is provided having a substrate with a trailing edge and a magnetic pole tip coupled to the trailing edge of the substrate and defining a bearing surface plane. A coil is adapted to orient a magnetic field of the magnetic pole tip to be substantially perpendicular to the bearing surface. An assist mechanism is spaced apart from the pole tip and is adapted to provide a supplemental magnetic field.

DETAILED DESCRIPTION OF ILLUSTRATIVE EMBODIMENTS

Figure 1:
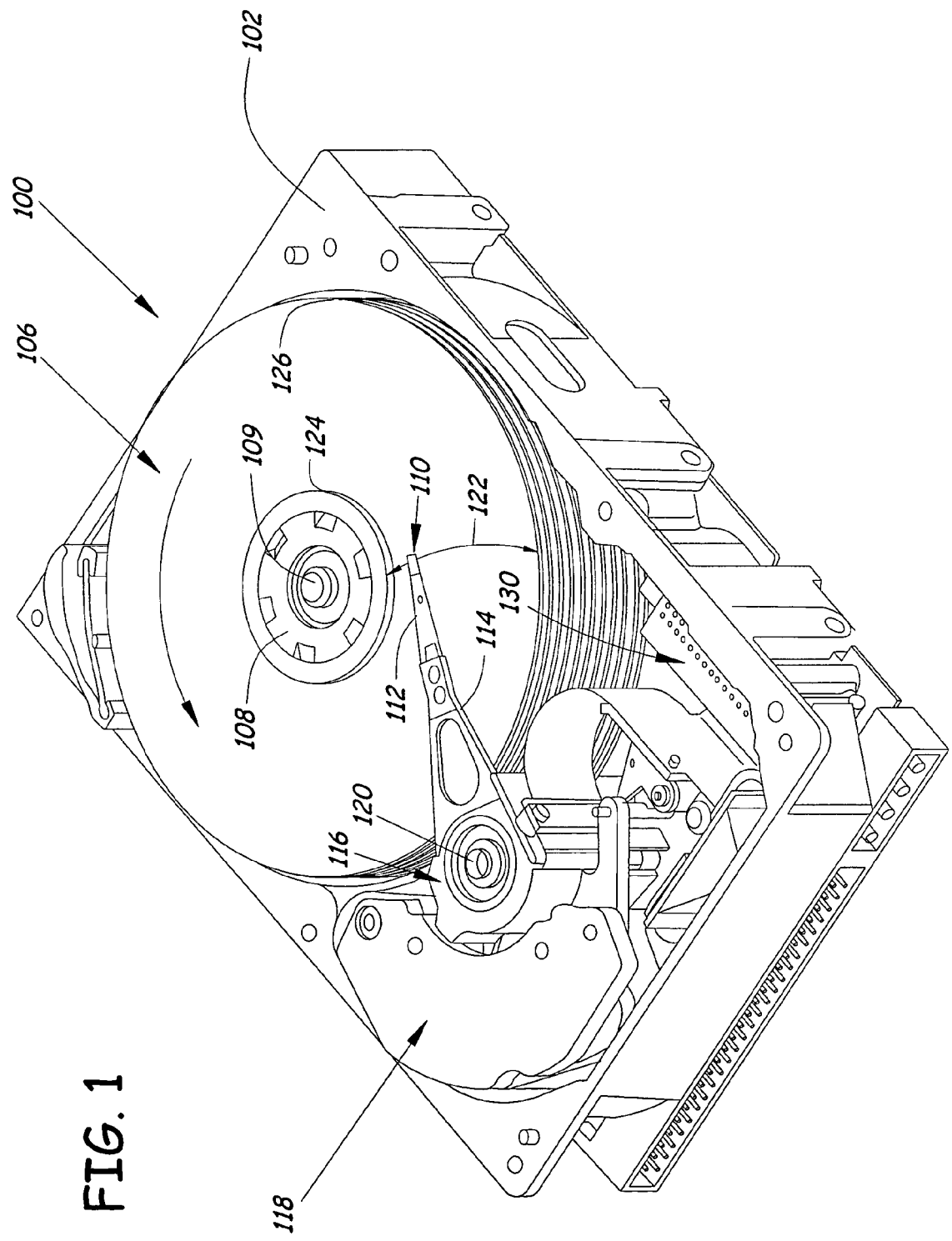
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 130 based on signals generated by sliders 110 and a host computer (not shown). Other types of actuators can also be used, such as linear actuators.

Figure 2:
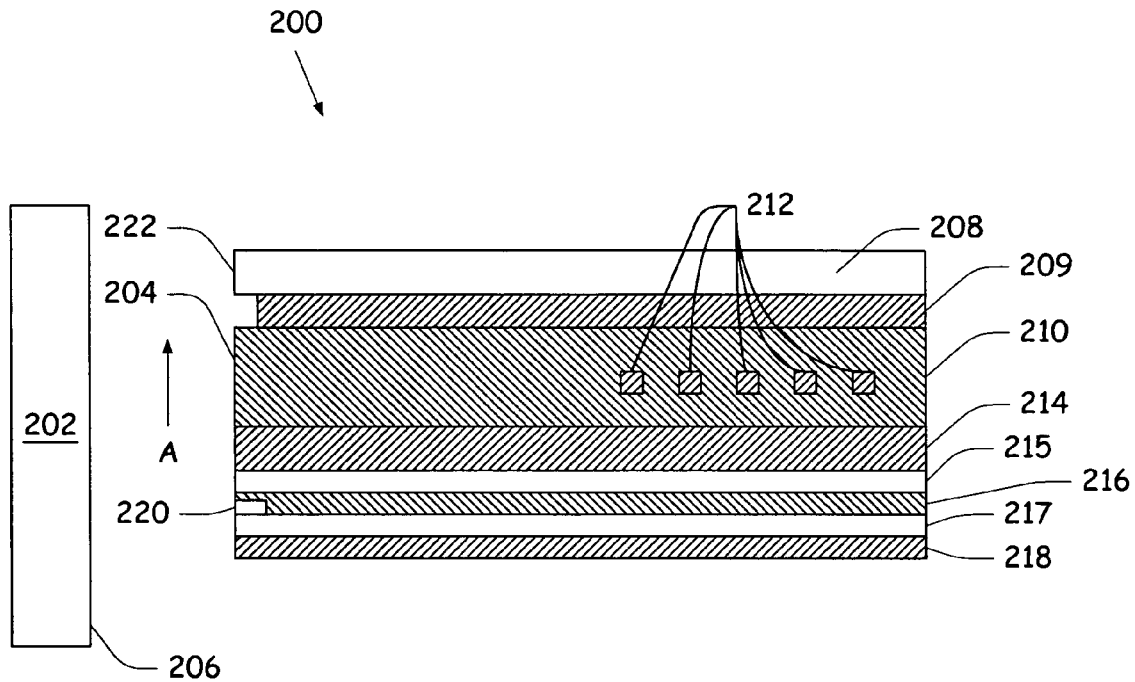
FIG. 2 is a cross-sectional view of a magnetic read/write head and magnetic disc taken along a plane normal to an air bearing surface of the read/write head.

FIG. 2 is a cross-sectional view of an exemplary magnetic read/write head 200 and magnetic disc 202 taken along a plane normal to air bearing surface 204 of read/write head 200. Air bearing surface 204 of magnetic read/write head 200 faces disc surface 206 of magnetic disc 202. Magnetic disc 202 travels or rotates in a direction relative to magnetic read/write head 200 as indicated by arrow A. Spacing between air bearing surface 204 and disc surface 206 is preferably minimized while avoiding contact between magnetic read/write head 200 and magnetic disc 202.

A writer portion of magnetic read/write head 200 includes top pole 208, yoke 209, insulator 210, conductive coils 212 and bottom pole/top shield 214. Conductive coils 212 are held in place between yoke 209 and top shield 214 by use of insulator 210. Conductive coils 212 are shown in FIG. 2 as one layer of coils but may also be formed of more layers of coils as is well known in the field of magnetic read/write head design. Other configurations for read/write head 200 can also be used in accordance with the present invention. For example, read/write head 200 can include a return pole positioned on an opposite side of top pole 208 from bottom pole 214 and/or bottom pole can be separated from a top reader shield.

A reader portion of magnetic read/write head 200 includes bottom pole/top shield 214, top gap layer 215, metal contact layer 216, bottom gap layer 217, bottom shield 218, and giant magnetoresistive (GMR) stack 220. Metal contact layer 216 is positioned between top gap layer 215 and bottom gap layer 217. GMR stack 220 is positioned between terminating ends of metal contact layer 216 and bottom gap layer 217. Top gap layer 215 is positioned between bottom pole/top shield 214 and metal contact layer 216. Bottom gap layer 217 is positioned between metal contact layer 216 and bottom shield 218. Bottom pole/top shield 214 functions both as a shield and as a shared pole for use in conjunction with top pole 208.

Figure 3:
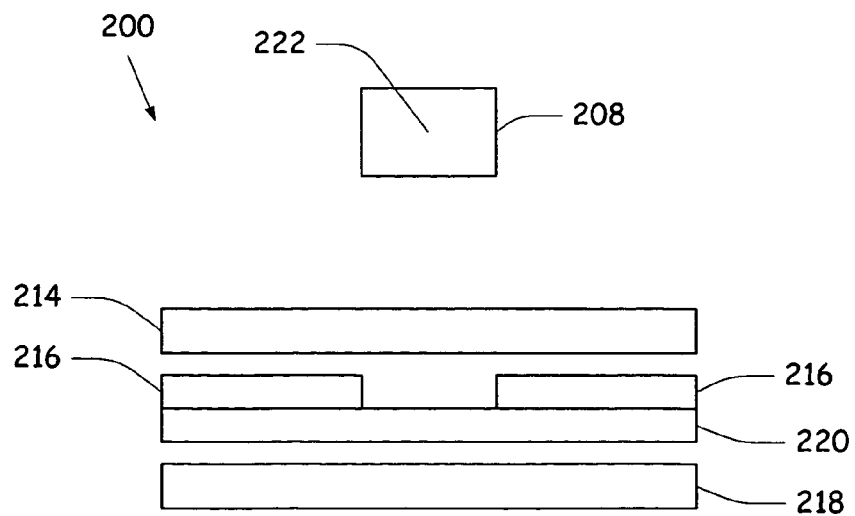
FIG. 3 is a layer diagram of an air bearing surface of a magnetic read/write head.

FIG. 3 is a layer diagram of air bearing surface 204 of magnetic read/write head 200. FIG. 3 illustrates the location of magnetically significant elements in magnetic read/write head 200 as they appear along air bearing surface 204 of magnetic read/write head 200 of FIG. 2. In FIG. 3, all spacing and insulating layers of magnetic read/write head 200 are omitted for clarity. Bottom shield 218 and bottom return pole/top shield 214 are spaced to provide for a location of GMR stack 220. GMR stack 220 has two passive regions defined as the portions of GMR stack 220 adjacent to metal contact layer 216. An active region of GMR stack 220 is defined as the portion of GMR stack 220 located between the two passive regions of GMR stack 220. The active region of GMR stack 220 defines a read sensor width. In an alternative embodiment, a tunneling reader can be used in which the shields are electrical contacts to the reader.

In accordance with an embodiment of the present invention, a magnetic assist element is utilized to assist a direction of magnetization of top pole 208, and in particular pole tip 222. As a result of the assist element, operation of head 200 is improved. In one example, a desired magnetization bias of pole tip 222 is maintained when current to conductive coils 212 is removed. The biasing aids in preventing unwanted erasure of tracks proximate pole tip 222. Single or multiple bias structures and/or a biasing coil can be used as discussed below.

Figure 4:
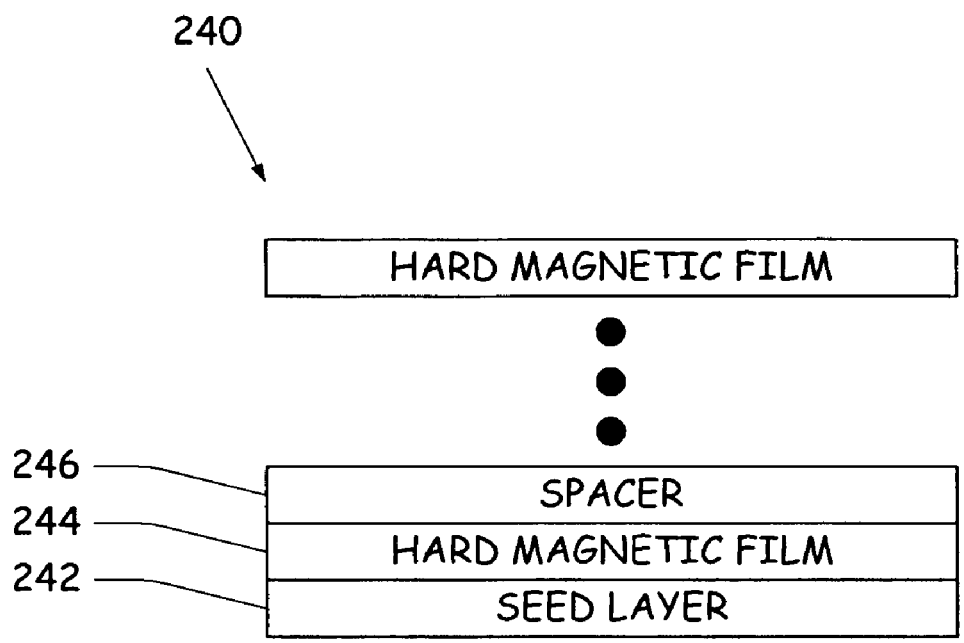
FIG. 4 is a block diagram of an exemplary bias structure used to assist in biasing a write pole.

FIG. 4 is a schematic block diagram of an exemplary bias structure that can be used in accordance with the present invention. Bias structure 240 includes a multi-layer structure to establish an assisted bias. In this embodiment, structure 240 is a hard bias structure for assisting the magnetization of pole tip 222. The multi-layered structure 240 includes a seed layer 242, a hard magnetic film 244 and a spacer layer 246. In one embodiment, seed layer 242 can be applied to a substrate of slider 110 (FIG. 1). The layers 242, 244 and 246 are repeated until structure 240 is of a desired thickness. Each of the layers 242, 244 and 246 can be made of different materials to establish a desired bias. In one exemplary embodiment, seed layer 242 is comprised of chromium (Cr), hard magnetic film 244 is comprised of cobalt-platinum (CoPt) and spacer layer 246 is comprised of aluminum oxide ($Al_2O_3$). Spacer layer 246 allows for a reduced thickness of hard magnetic film and maintains coercivity of structure 240.

Figure 5:
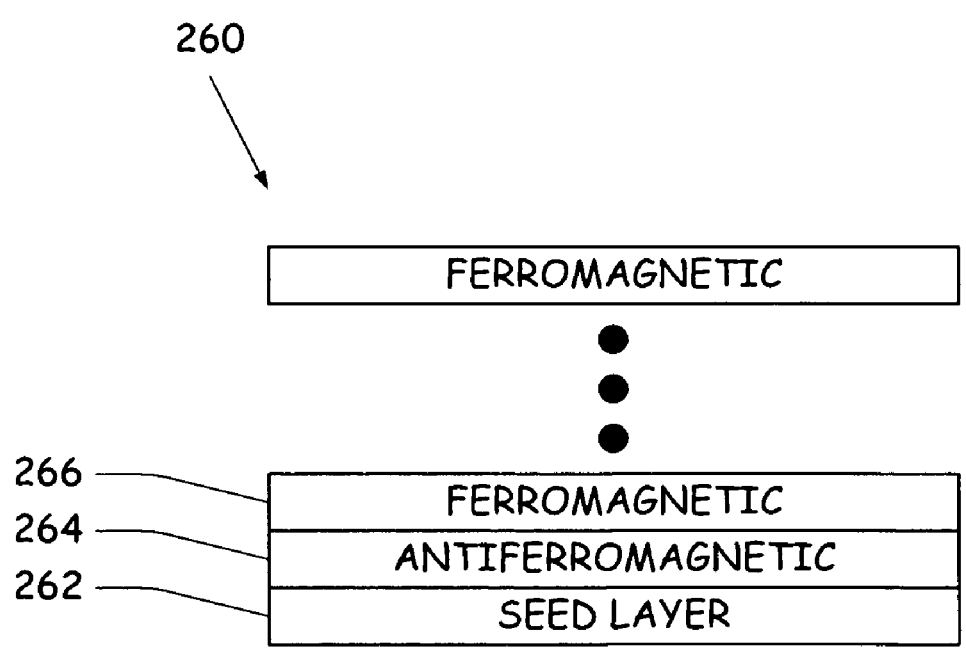
FIG. 5 is a block diagram of an exemplary biasing structure used to assist in biasing a write pole.

FIG. 5 is a schematic block diagram of another exemplary bias structure 260 in accordance with an embodiment of the present invention. Structure 260 is a soft magnetic bias structure that includes a seed layer 262, an anti-ferromagnetic layer 264 and a ferromagnetic layer 266. The structure has a well-defined anisotropy at the remnant state to aid in magnetizing pole tip 222. In one embodiment, seed layer 262 is comprised of nickel chromium (NiCr), anti-ferromagnetic layer 264 is comprised of iridium manganese (IrMn) or platinum manganese (PtMn) and ferromagnetic material 266 is comprised of nickel iron (NiFe) or cobalt-iron (CoFe).

Figure 6:
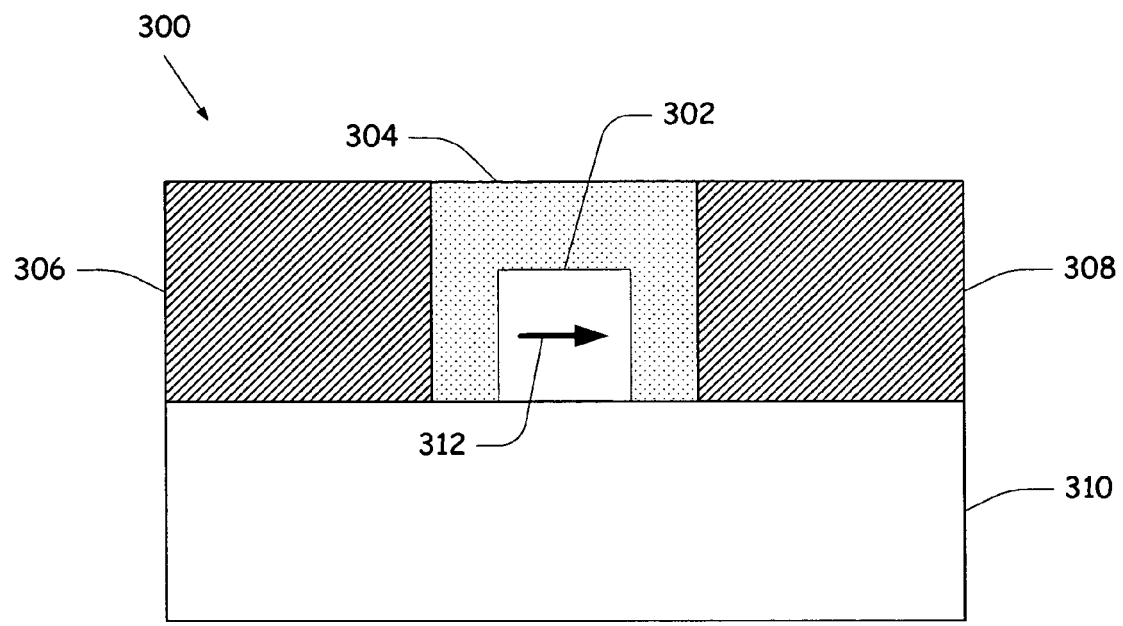
FIGS. 6-20 are schematic diagrams of exemplary read/write heads in accordance with embodiments of the present invention.
Figure 7:
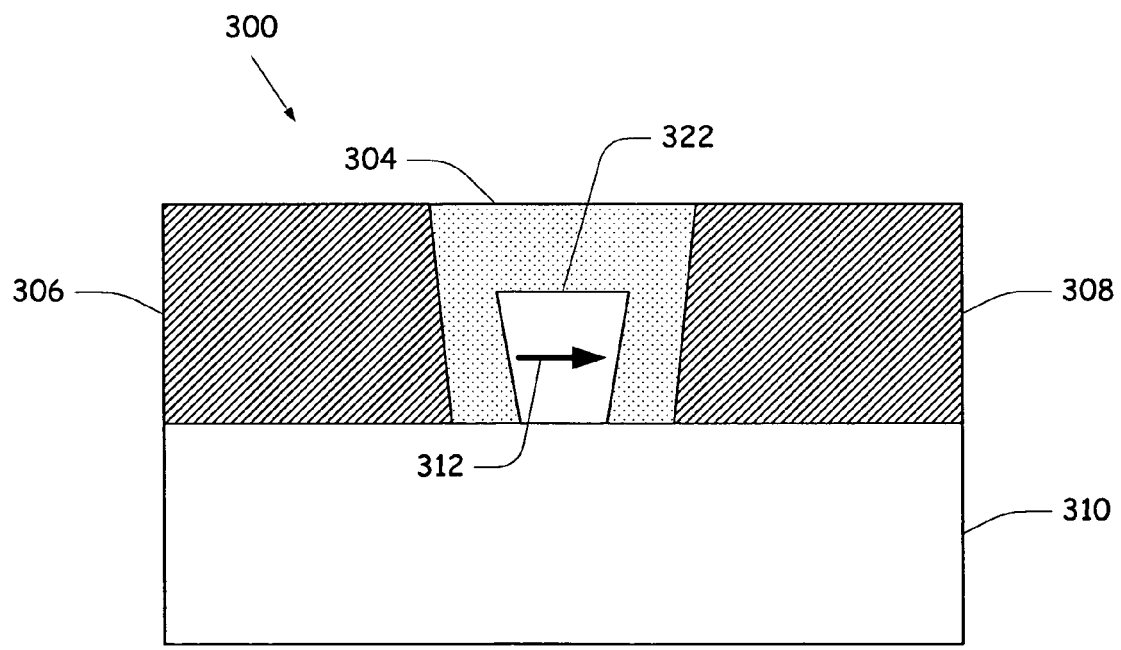

In accordance with the present invention, exemplary bias structures 240 and 260 can be utilized to assist biasing of a pole tip of a read/write head, for example to prevent undesired erasure of bits proximate the pole tip. FIG. 6 illustrates a schematic diagram of an exemplary read/write head 300 as viewed from the surface of a disc. Pole tip 302, spacer 304 and bias layers 306 and 308 are applied to a substrate 310. Pole tip 302 includes a magnetic field oriented in a direction indicated by arrow 312. As illustrated, magnetic field 312 is parallel to a bearing surface of read/write head 300. When a current is induced in a write coil, magnetic field 312 is oriented towards a surface of a disc to alter magnetic transitions thereon. When the current in the write coil is removed, bias layers 306 and 308 assist in orienting magnetic field 312 to be parallel with the bearing surface as illustrated in FIG. 6. In this embodiment, spacer 304 can be non-magnetic in order to magnetically decouple pole tip 302 from bias layers 306 and 308 and thus prevent interference while pole tip 302 writes to a disc. Bias layers 306 and 308 are positioned on either side of spacer layer 304. Spacer layer 304 can be comprised of a variety of different materials including a dielectric film, a semiconductor film and a metal film. FIG. 7 illustrates an alternative embodiment of the present invention that utilizes a trapezoidal shape of a pole tip. The same reference numerals are used in FIG. 7 as were used in FIG. 6 for the same or similar elements In FIG. 7, the shape of pole tip 322 is trapezoidal and includes a width that is greater at a position further away from substrate 310.

Figure 8:
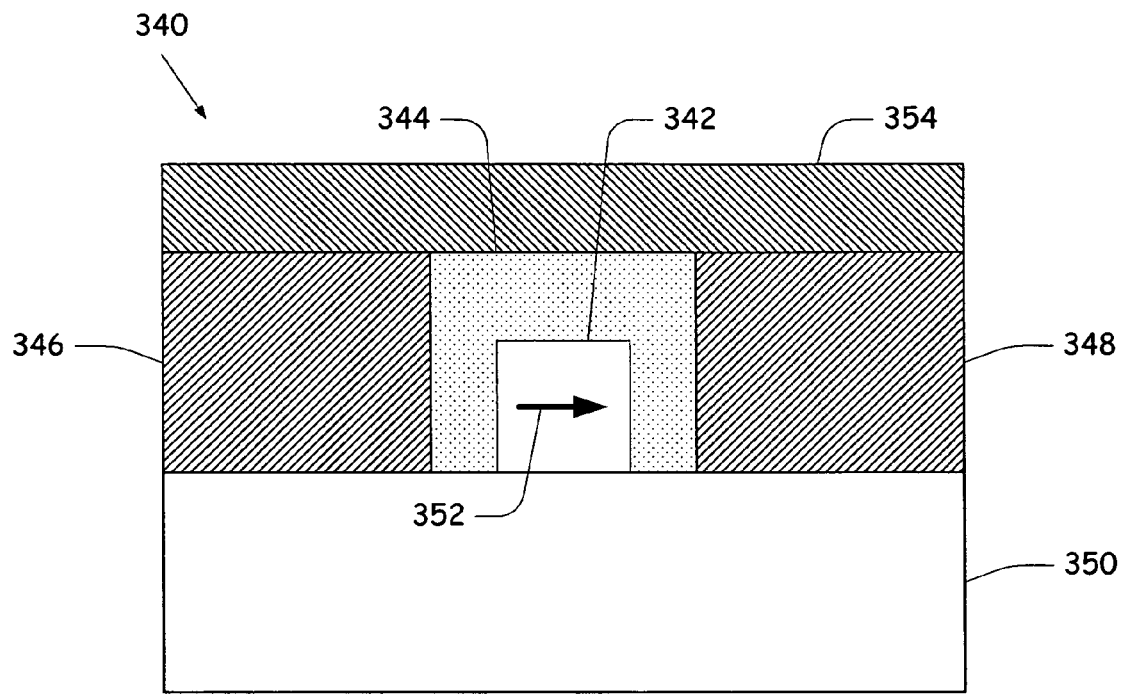
Figure 9:
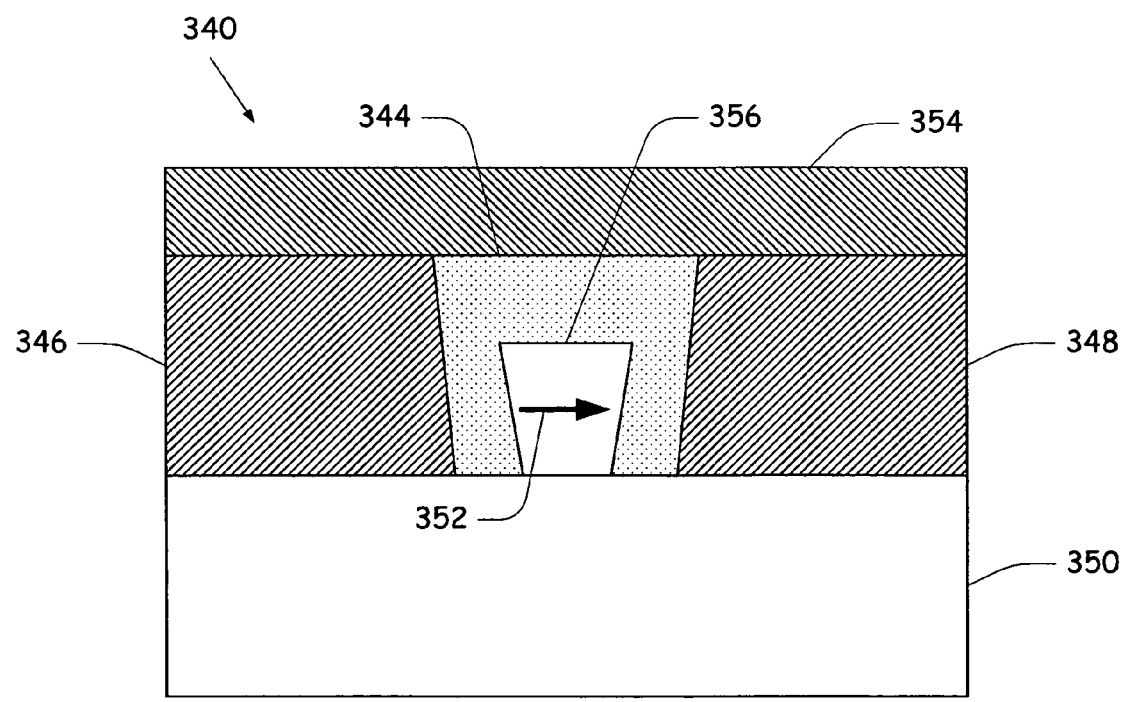

In accordance with another embodiment of the present invention, a soft magnetic shield can be used to improve the gradient of the magnetic field of an associated pole tip. FIG. 8 is a schematic view of an illustrative embodiment of a read/write head 340. Pole tip 342, spacer 344 and bias layers 346 and 348 are applied to a substrate 350. Pole 342 is a rectangular shape and includes a magnetic field 352 oriented parallel with respect to a bearing surface of read/write head 340. A soft magnetic shield 354 is applied to spacer 344 and bias layers 346 and 348 at a position away from substrate 350. Spacer 344 is a non-magnetic spacer and thus magnetically decouples bias layers 346 and 348 as well as magnetic shield 354 from pole tip 342. A trapezoidal pole tip can also be used with the embodiment illustrated in FIG. 8. FIG. 9 illustrates the embodiment of FIG. 8 with a trapezoidal pole tip 356. The same or similar elements in FIG. 8 are similarly numbered in FIG. 9.

Figure 10:
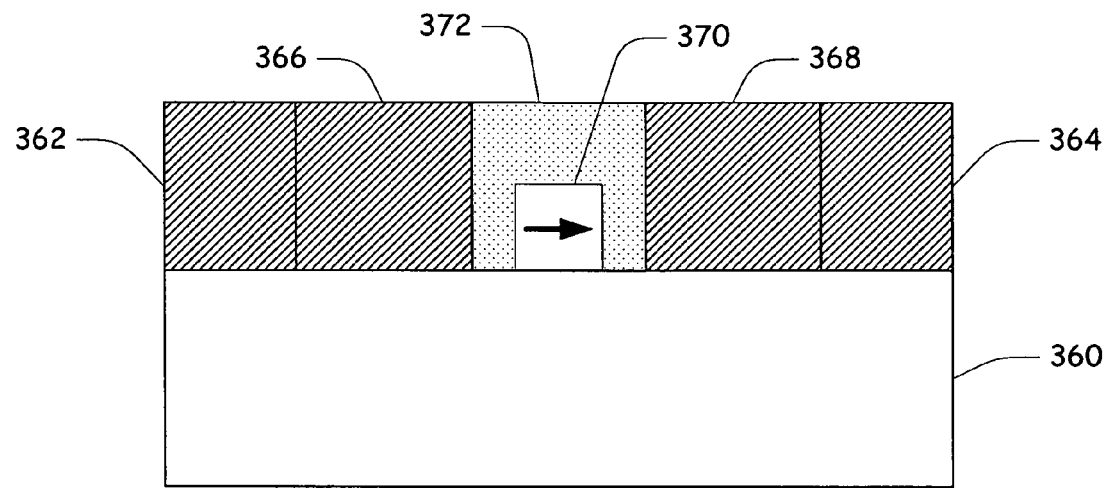
Figure 11:
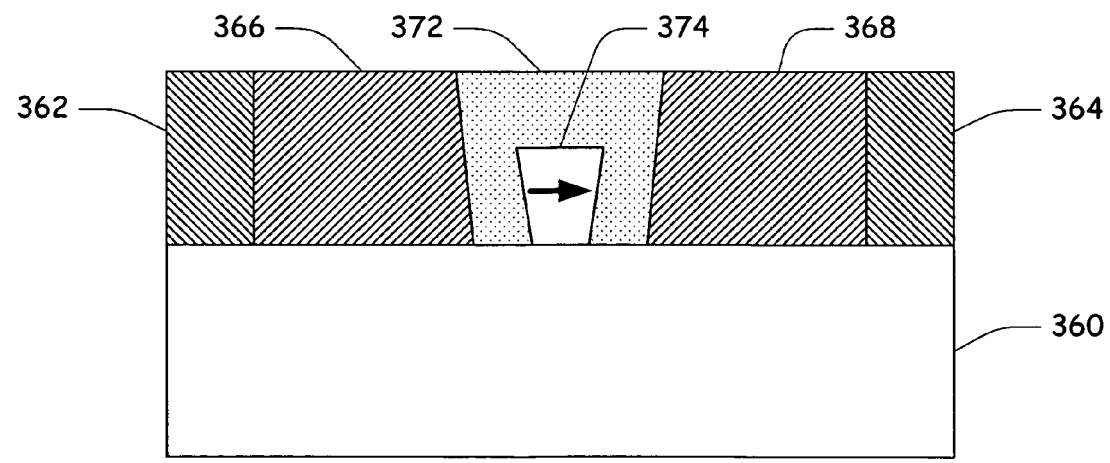

Alternative positions for soft magnetic shields can also be used in accordance with the present invention. FIGS. 10-13 illustrate various embodiments for including soft magnetic shields with a read/write head. FIG. 10 illustrates a substrate 360. Bias layers 362 and 364, soft magnetic shields 366 and 368, as well as pole tip 370 and non-magnetic spacer 372 are applied to substrate 360. Soft magnetic shields 366 and 368 are positioned on either side of pole tip 370 and magnetically decoupled from pole tip 370 by non-magnetic spacer 372. Bias layers 362 and 364 are positioned adjacent to sheild 366 and 368, respectively. FIG. 11 illustrates a similar embodiment wherein same or similar elements in FIG. 10 are similarly numbered. In this embodiment, a trapezoidal shaped pole tip 374 is used.

Figure 12:
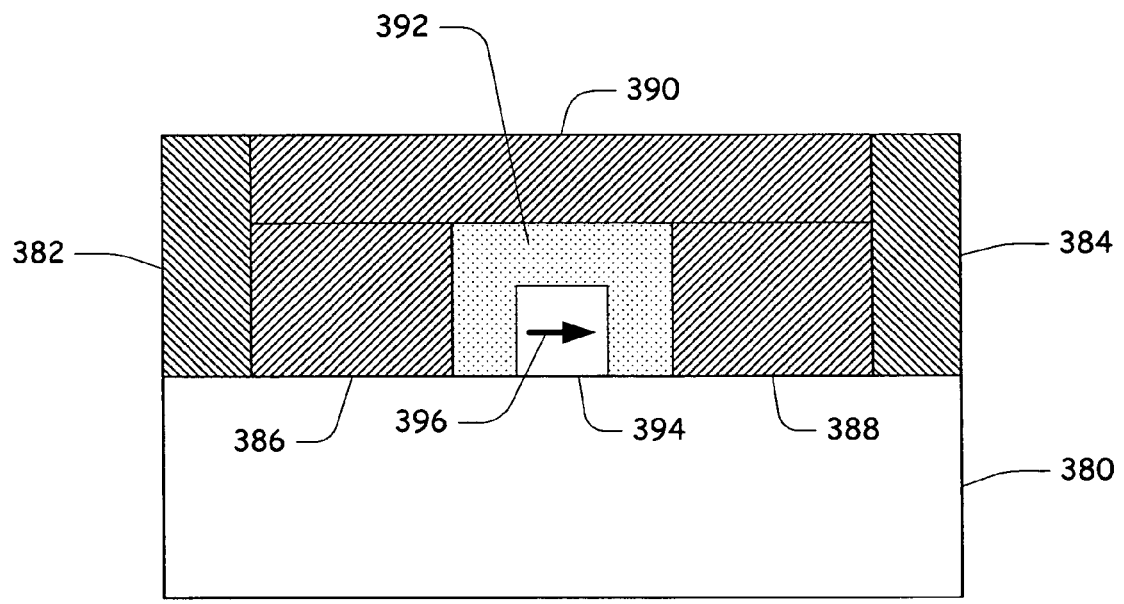
Figure 13:
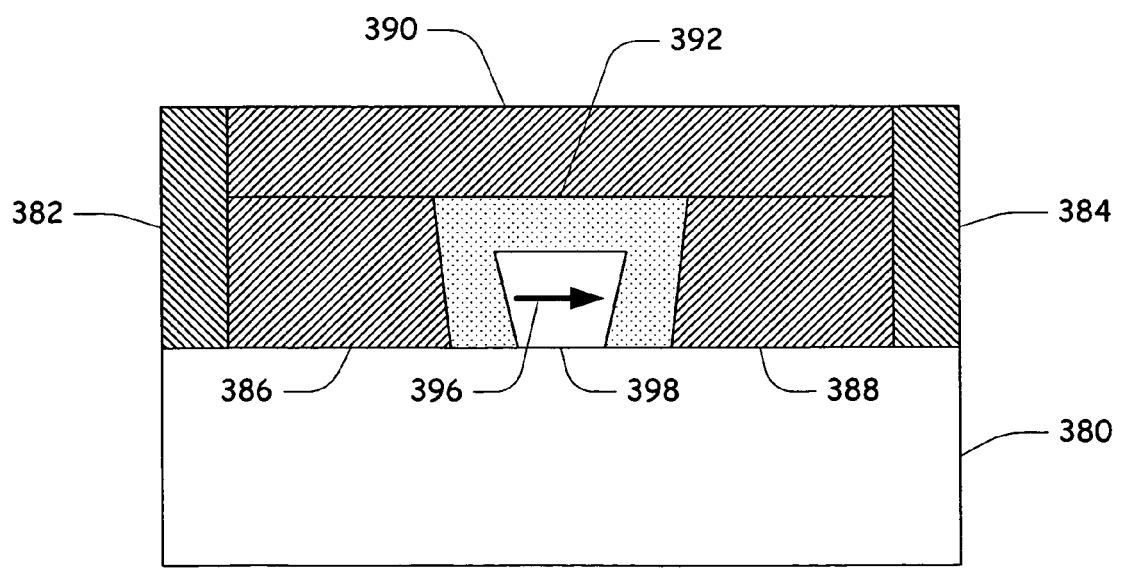

FIGS. 12 and 13 illustrate soft magnetic shields surrounding a pole tip on three sides. FIG. 12 includes a substrate 380, bias layers 382 and 384, soft magnetic shields 386, 388 and 390, non-magnetic spacer 392 and pole tip 394. Pole tip 394 includes a magnetic field 396 oriented parallel to a bearing surface of the read/write head. Shields 386, 388 and 390 surround non-magnetic spacer 392, which magnetically decouples pole tip 394 from the shields 386, 388 and 390. Bias layers 382 and 384 are positioned adjacent to shields 386 and 388, respectively. FIG. 13 illustrates an embodiment similar to FIG. 12 wherein a trapezoidal pole tip 398 is used.

Figure 14:
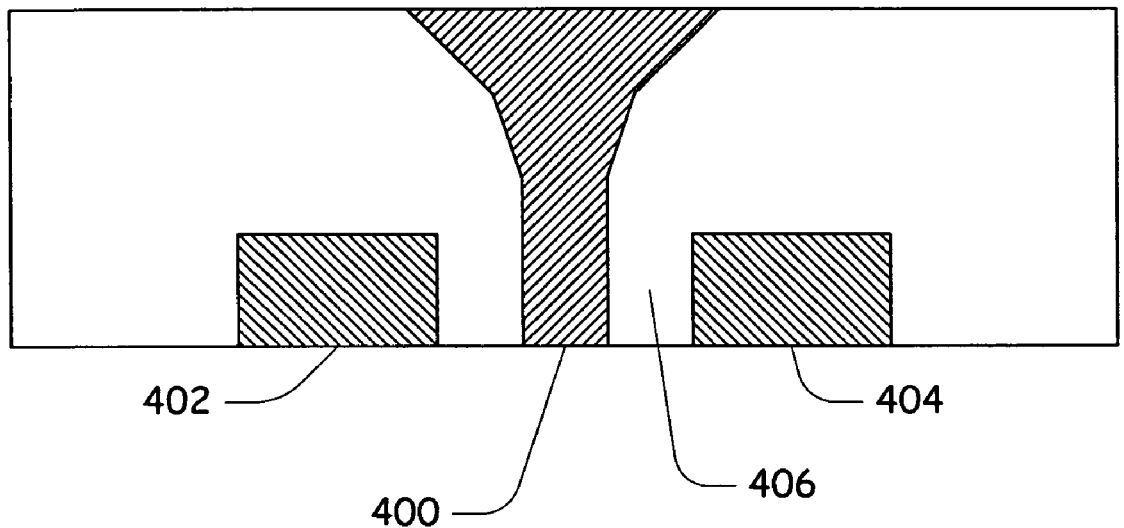
Figure 15:
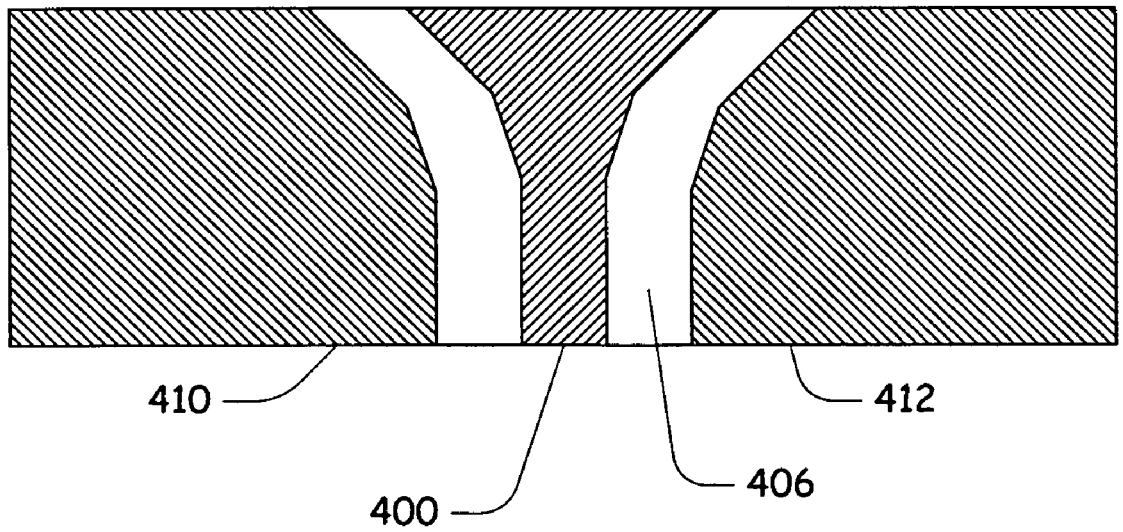
Figure 16:
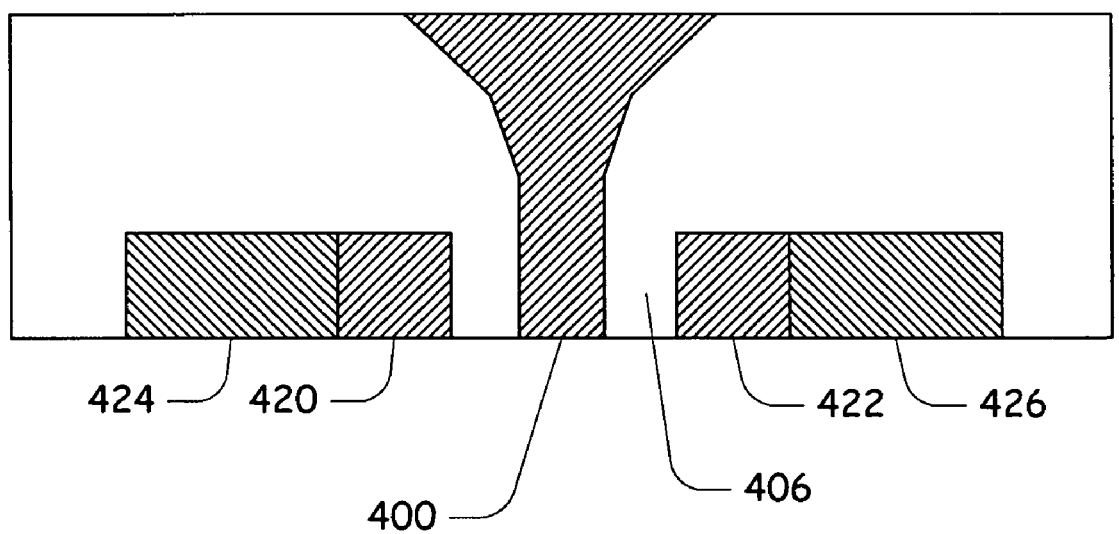

In accordance with another embodiment of the present invention, biasing layers may be of different sizes, for example when viewed from a trailing edge of a substrate. In FIG. 14, pole tip 400 is biased by magnetic bias layers 402 and 404. Non-magnetic spacer 406 magnetically decouples pole tip 400 from bias layers 402 and 404, respectively. In one embodiment, the height of bias layers 402 and 404 is about 25% of a height of a trailing edge of an associated substrate, although other heights can be used to provide the desired biasing. FIG. 15 illustrates an alternative embodiment wherein the same reference numerals as used in FIG. 14 are used for the same or similar elements. Bias layers 410 and 412 of FIG. 15 have an increased height and size as compared to layers 402 and 404 of FIG. 14. In one embodiment, bias layers 410 and 412 have a height that is about 75% of a height of a trailing edge of an associated substrate, although other heights may be used to provide the desired biasing. Positioning of soft magnetic shields from a trailing edge of a substrate is also illustrated in FIG. 16. As illustrated in FIG. 16, soft magnetic shields 420 and 422 can be positioned on either side of pole tip 400 and adjacent to bias layers 422 and 426, respectively.

Figure 17:
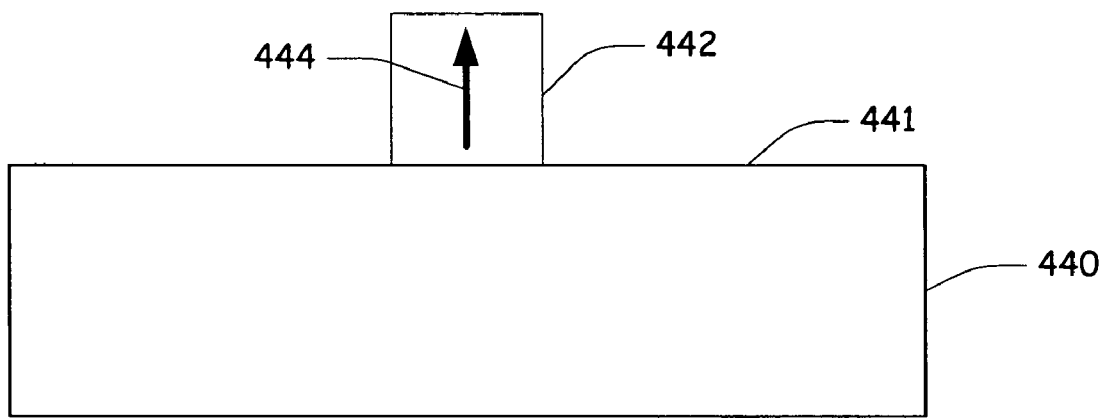
Figure 18:
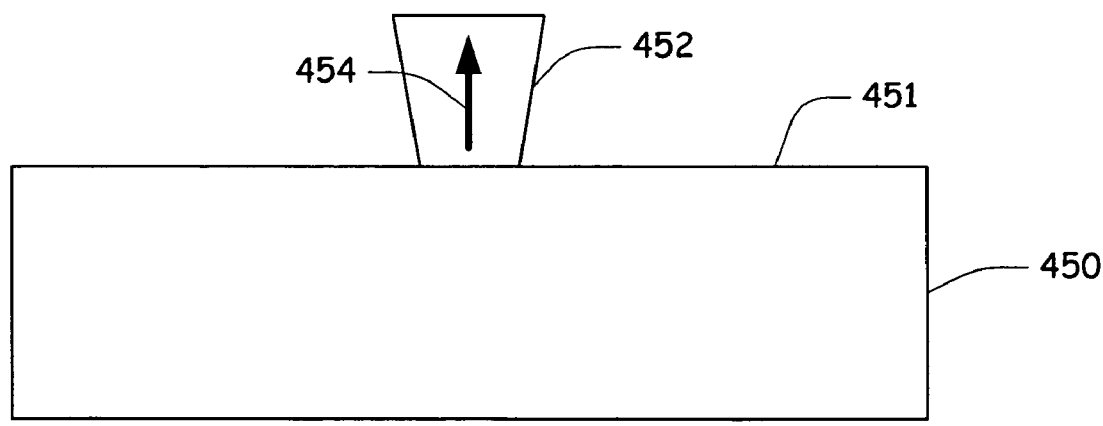

In accordance with another embodiment of the present invention, a pole tip can include a magnetic anisotropy that extends in a direction from a substrate to a position away from the substrate to prevent unwanted sidetrack erasure of bits proximate a pole tip. FIG. 17 illustrates a substrate 440 with a trailing edge 441 and a rectangular pole tip 442. Pole tip 442 has an anisotropy that extends from substrate 440 in a direction away from substrate 440 and perpendicular to trailing edge 441 as indicated by arrow 444. The direction of the anisotropy can reduce side track erasure that can result from a magnetic gradient in a direction parallel to trailing edge 441 of substrate 440. FIG. 18 illustrates that a trapezoidal pole tip can also be used. FIG. 18 illustrates a substrate 450, trailing edge 451, pole tip 452 and an anisotropy indicated by arrow 454 that is perpendicular to trailing edge 451. In one embodiment, the anisotropy can be created by an "in-stack" bias structure oriented such that the anisotropy extends away from an associated trailing edge. In an alternative embodiment, the shape of the pole tip can be altered to create the desired direction of anisotropy. For example, a length of a pole tip can be extended away from an associated trailing edge to create the anisotropy.

Figure 19:
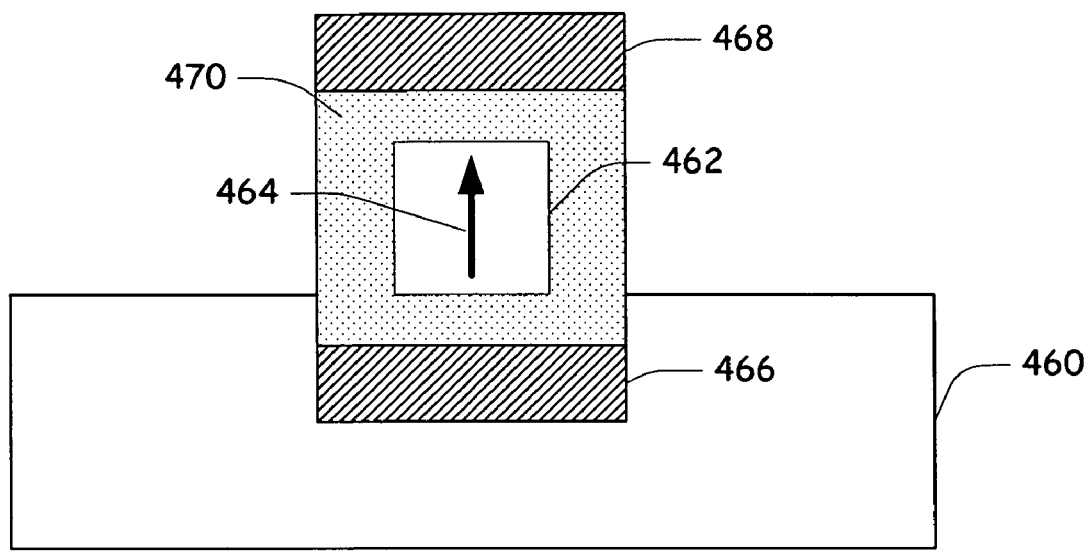
Figure 20:
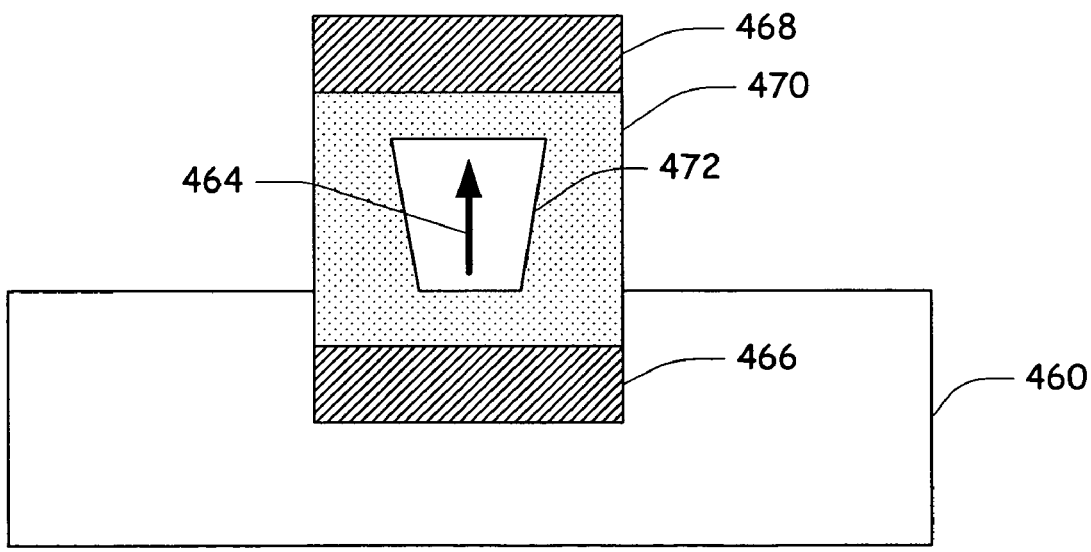

Biasing structures can also be used to bias the anisotropy of a pole tip in a direction perpendicular to a trailing edge of a substrate to a desired state when a write coil is turned off. FIG. 19 illustrates a substrate 460 and a pole tip 462 having an anisotropy in a direction indicated by arrow 464. Bias layers 466 and 468 can be used to assist the magnetic bias of pole tip 462. A magnetic spacer 470 surrounding pole tip 462 can be used to magnetically decouple pole tip 462 from bias layers 466 and 468. A trapezoidal pole tip can also be used such as pole tip 472 illustrated in FIG. 20, which includes the same reference numerals as used in FIG. 19 for the same or similar elements.

Figure 21:
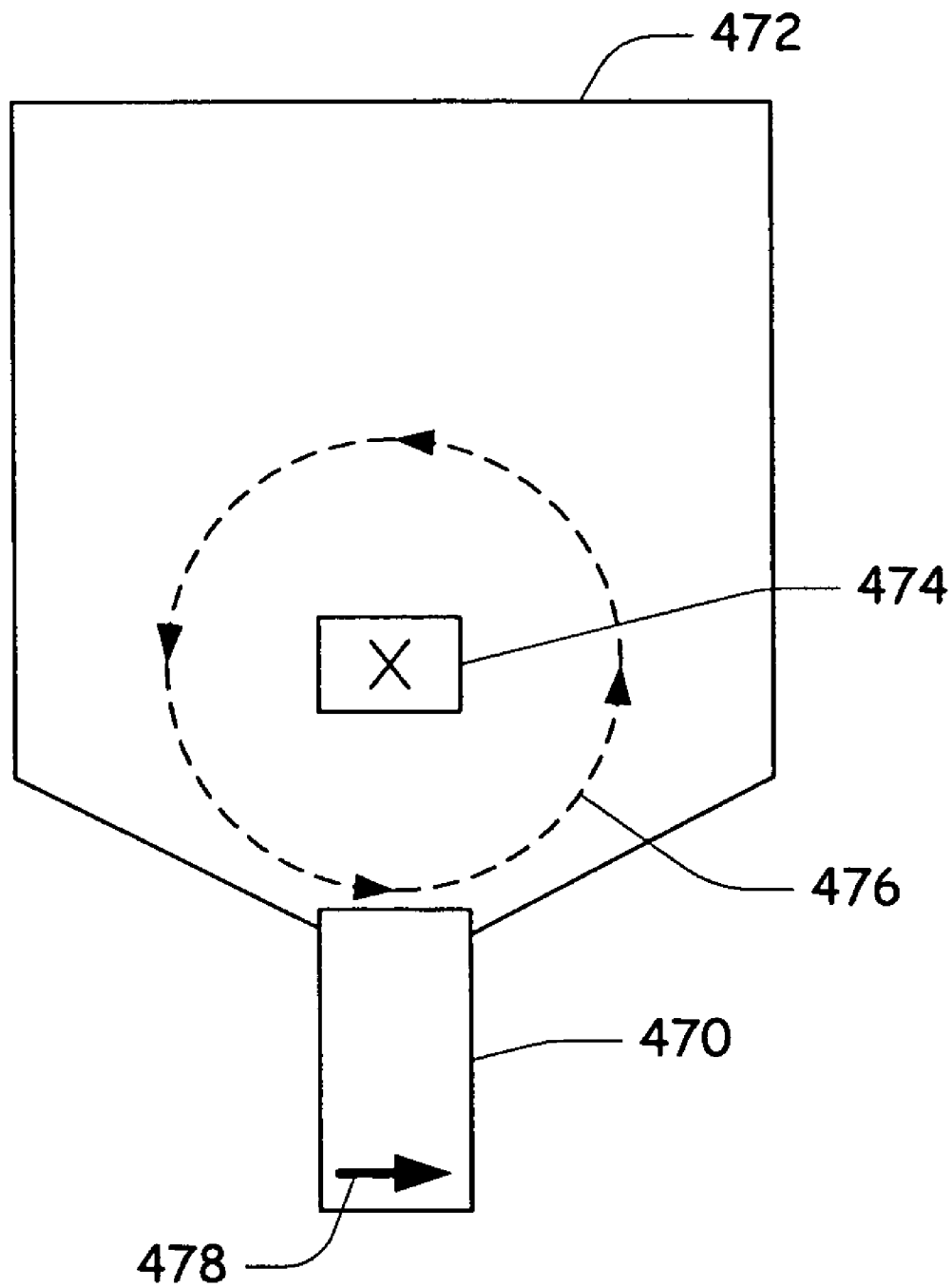
FIGS. 21-22 are schematic diagrams of exemplary read/write heads utilizing a bias coil to assist in biasing a write pole.
Figure 22:
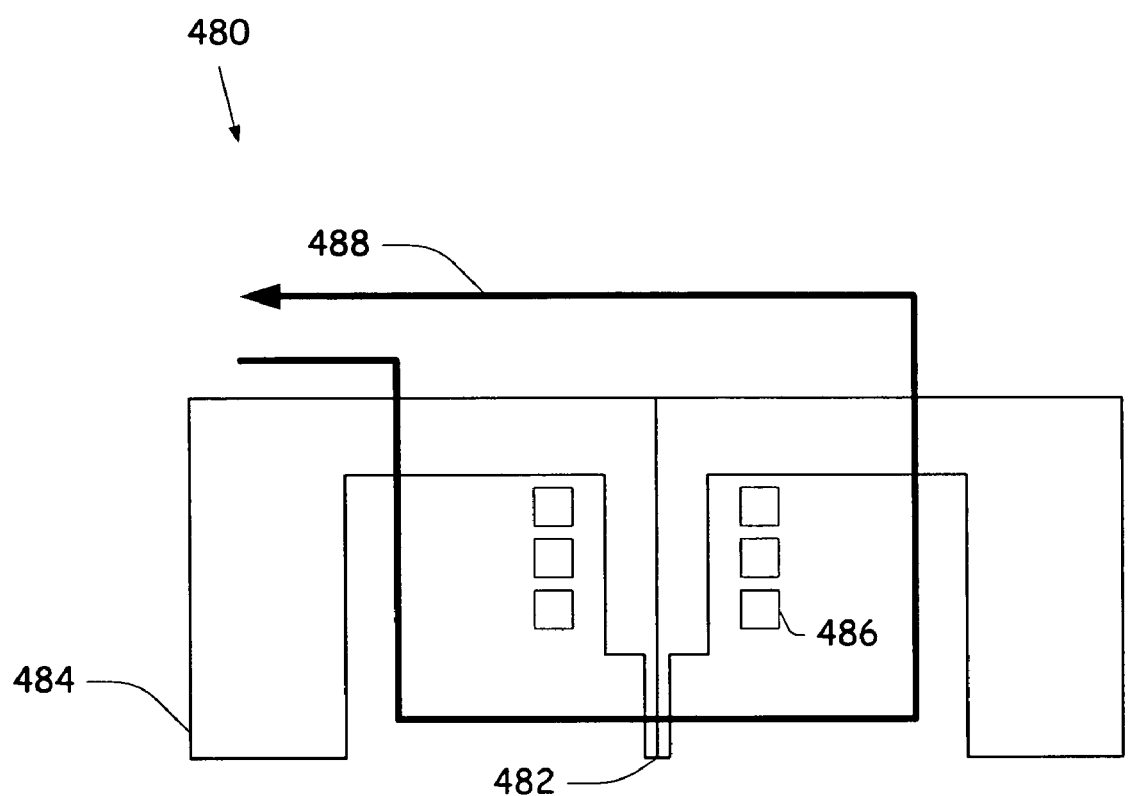

In accordance with a further embodiment of the present invention, a bias coil 474 can be used to orient a magnetic field of a pole tip in a desired direction after a write current has been removed. FIG. 21 schematically illustrates a write pole 470 coupled to a yoke 472. Coil 474 generates a current to induce a magnetic field 476 and assist in returning the magnetic field in write pole 470 to a desired state, for example to a state with a field oriented in a direction indicated by arrow 478. FIG. 22 is a schematic view of a read/write head 480 according to an alternative embodiment. Read/write head 480 includes a write pole 482 and return pole 484. A write coil 486 is provided to orient the magnetic field of write pole 482 while writing transitions to the media. A bias coil 488 is provided to orient the magnetic field of write pole 482 when current through writer coil 486 is removed.

In a further embodiment, the write pole can be assisted with a supplemental radio frequency (RF) field. The RF field can lower the required write field intensity and shorten the time needed to perform a write operation. FIGS. 23-31 illustrate exemplary embodiments for including an RF field as an assist mechanism for operation of a write pole.

In the embodiment illustrated, the RF field can be localized near the writer main pole tip and its associated write field. This proximity of the RF field to the main pole tip can increase the field strength of the main pole and can help minimize interactions with the RF field away from the pole tip that could result in undesirable erasure. The RF field can be developed to act equivalently for both bit polarities. An RF oscillator can be used to drive the RF field to be rapidly switchable (for example greater than a data rate) to provide assist during writing and no-assist during reading to reduce erasure and other noise. In addition, the RF field frequency can be developed with a high Q factor and have an adjustable frequency in order to tune the oscillator to the media resonance frequency.

The RF oscillator can be of the type that utilizes spin momentum transfer to generate a local and tunable RF field in the GHz range. This oscillator device is similar to a current perpendicular-to-plane giant magnetorestrictive (CPP GMR) spin valve. Methods to fabricate CPP GMR devices can be utilized to develop the RF oscillator. The RF field generated can significantly reduce the required media-switching field and thereby improve writability of perpendicular media.

The RF oscillator can be constructed with an arrangement of layer magnetizations as illustrated in FIGS. 23-31. The RF oscillator can include an oscillating layer and a polarizing layer separated by a spacer. The average magnetization in the polarizing and oscillating layers can be oriented orthogonal with respect to each other. The polarizing layer can be fixed in orientation by suitable bias and have strong electron spin polarizing properties. In one embodiment, spin momentum transfer above a current that is approximately 5E-7 A/cm2 can induce magnetization oscillation in the oscillating layer. This current provides oscillations that occur to provide a simple means to quickly turn the RF field on and off. Furthermore, the frequency ($\omega$) of the oscillation is tunable according to the relation ($\omega=[I_c*g/e*\alpha*M]$) for current I, scalar function g, damping $\alpha$, electron change e and magnetization M. Various current and materials variations permit frequencies of the oscillator in the 1-10 GHz range. This ability to tune the frequency permits important adjustments to match resonance of the media magnetization and thereby optimize writability. The Q-factor of the RF oscillators can be high (for example greater than 1000). Furthermore, the RF oscillator can be similar in size and width to the main pole. This size can allow low currents with high current density and single domain like behavior of the oscillating layer.

The oscillator can be constructed in a vertical orientation (along the air bearing surface) as illustrated in FIGS. 23-27 or in a horizontal orientation (perpendicular to the air bearing surface) as illustrated in FIGS. 28-31. The primary write field is produced as in a standard inductive writer main pole. The oscillator device produces a local RF assist field near the leading edge of the main pole.

Figure 23:
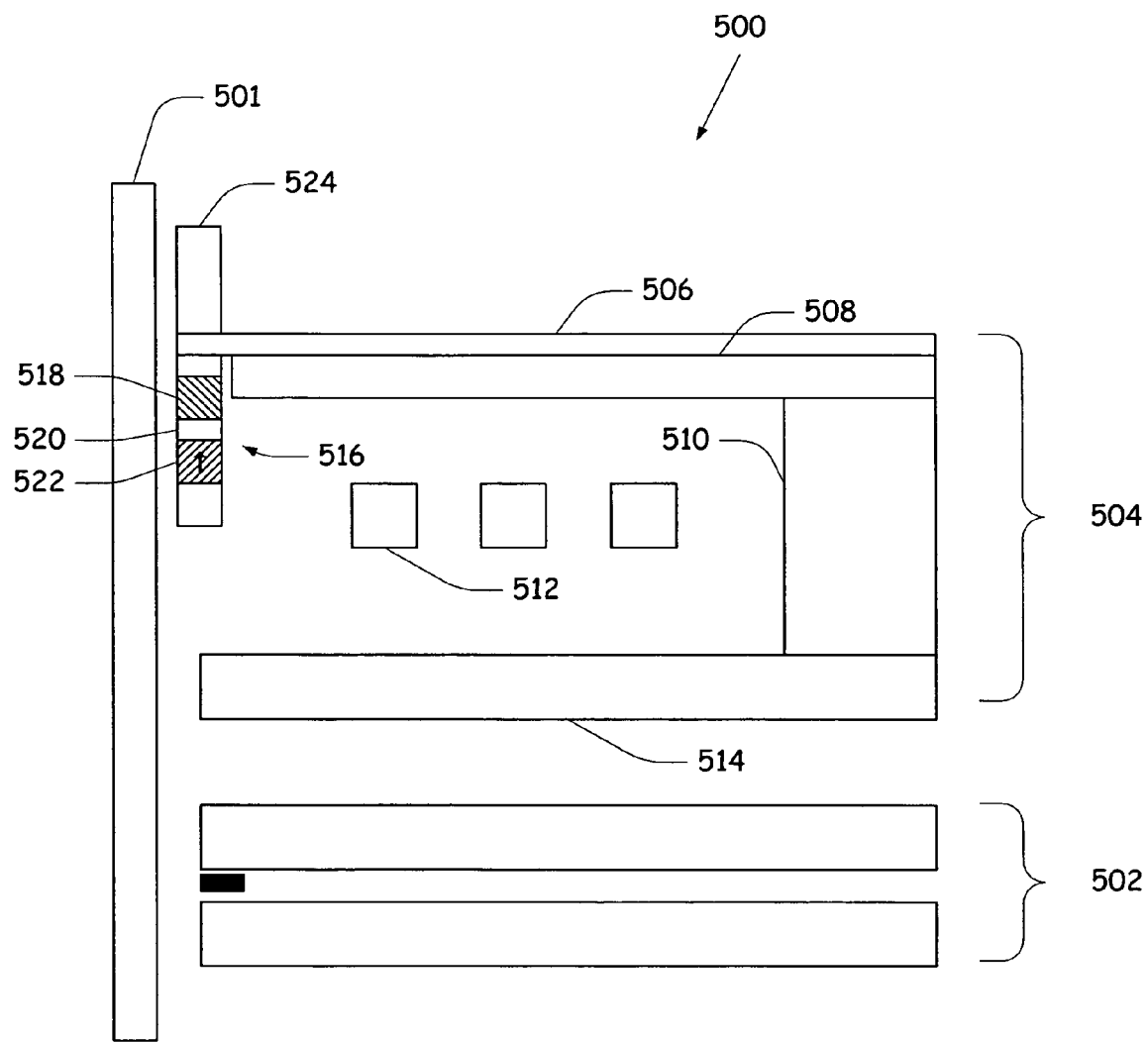
FIG. 23 is a cross-sectional view of a read/write head and an oscillator in accordance with an alternative embodiment of the present invention.
Figure 24:
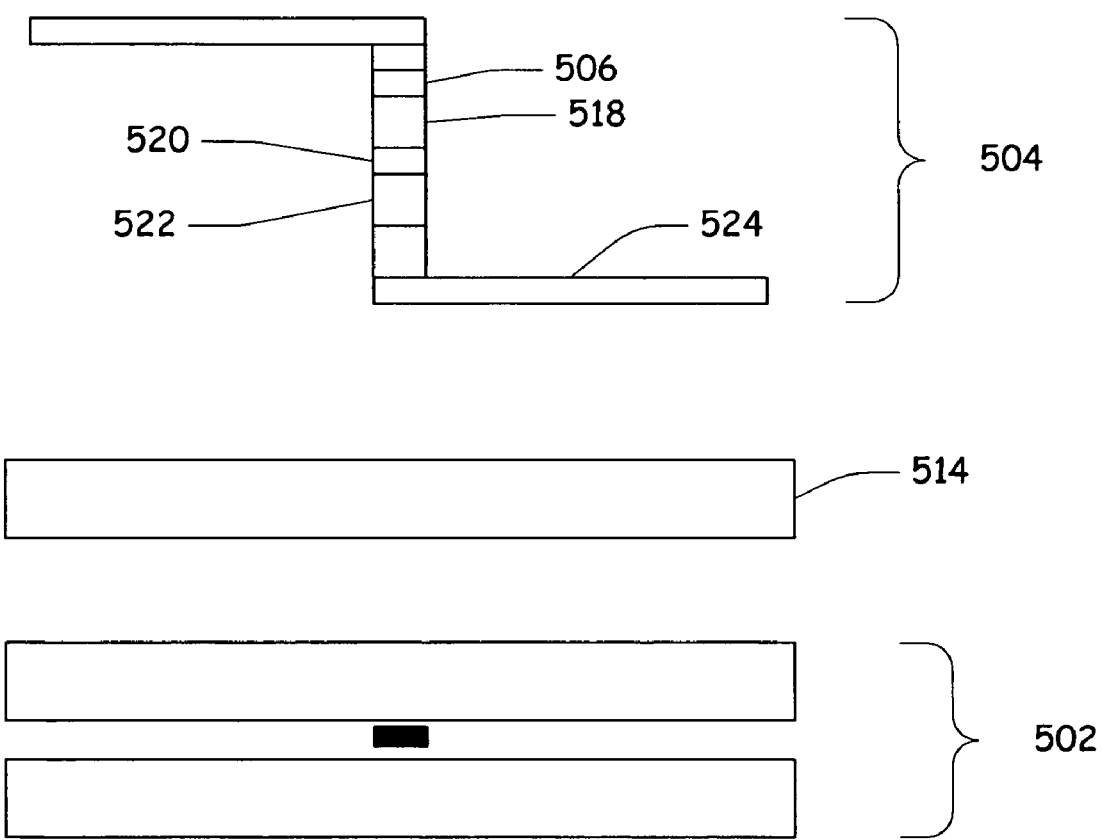
FIG. 24 is a layer diagram of an air bearing surface of the read/write head in FIG. 23.

FIGS. 23 and 24 illustrate a vertically oriented oscillator that can be developed with either an axial or a planar oscillator. Head 500 is positioned above medium 501 and includes a reader portion 502 and a writer portion 504. Writer portion 504 includes a main pole 506, yoke 508, closer 510, coil 512 and return pole 514. RF oscillator 516 assists the magnetization of main pole 506. RF oscillator 516 includes an oscillating layer 518, a spacer 520 and polarizing layer 522. An arrow within polarizing layer 522 illustrates a direction of magnetic bias of the layer 522. The oscillator is coupled to a conductor 524, which provides current to drive the oscillator 516. RF oscillator 516 can be devised to induce an axial or planar field.

Figure 25:
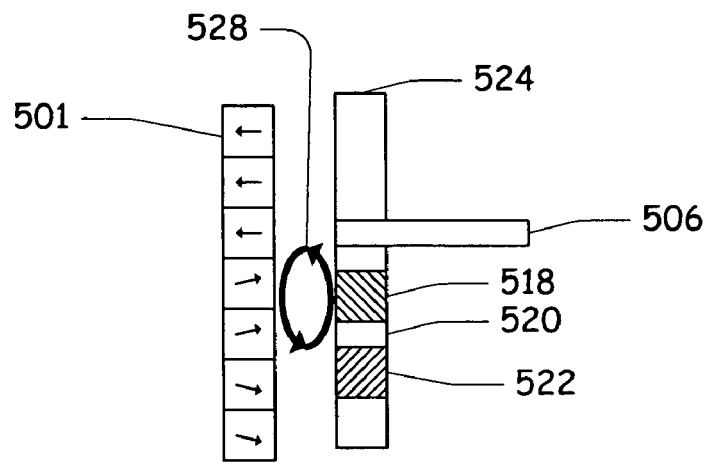
FIG. 25 is a cross-sectional view of a planar oscillator of the read/write head of FIGS. 23-24.
Figure 26:
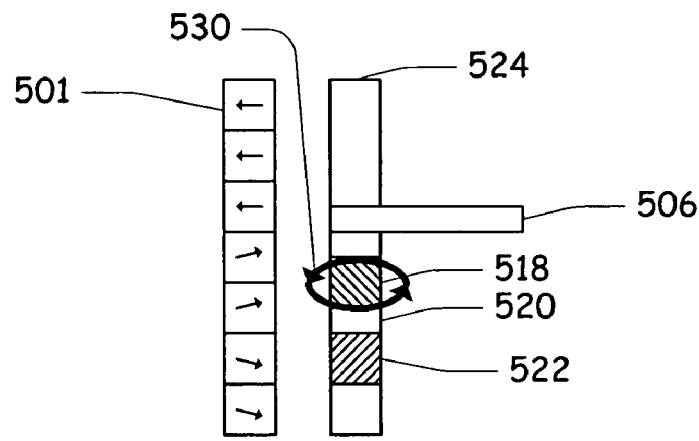
FIG. 26 is a cross-sectional view of an axial oscillator of the read/write head of FIGS. 23-24.
Figure 27:
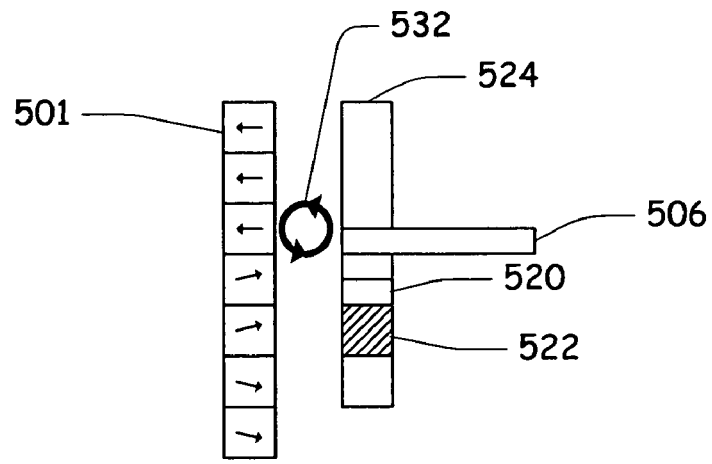
FIG. 27 is a cross-sectional view of a planar oscillator of the read/write head of FIGS. 23-24.

With an axial oscillator, as in FIG. 25, the polarizing (reference) layer 522 is fixed parallel to ABS and the orthogonal oscillating layer rotates around the axis of magnetization of the polarizing layer. A field 528 created by oscillator 576 acts upon the media magnetization to cause precessing in the media and thereby lower the required switching field for the writing field produced by the main pole. This precessing is shown by angled arrows of magnetization of bits in media 501. The angular amplitude of the field can be set to prevent chaotic switching of the oscillating layer magnetization. FIG. 26 shows a planar style oscillator that is not restricted to moderate amplitudes of oscillation. In this embodiment, the current path through oscillator 516 can be constructed to include or exclude main pole 506. Field 530 is generated to rotate around an axis orthogonal to the axis of magnetization of polarizing layer 522. In the embodiment illustrated in FIG. 27, another axial oscillator is shown in which the head does not have a discrete oscillating layer but current instead drives oscillations directly in the main pole magnetization. It is worth noting that the orthogonal RF assist field will equally effect precession in both perpendicular orientations of the media magnetization. The magnetization of the oscillating layer can be chosen such that it does not affect erasure in the quiescent (non-oscillating, no-write) state.

Figure 28:
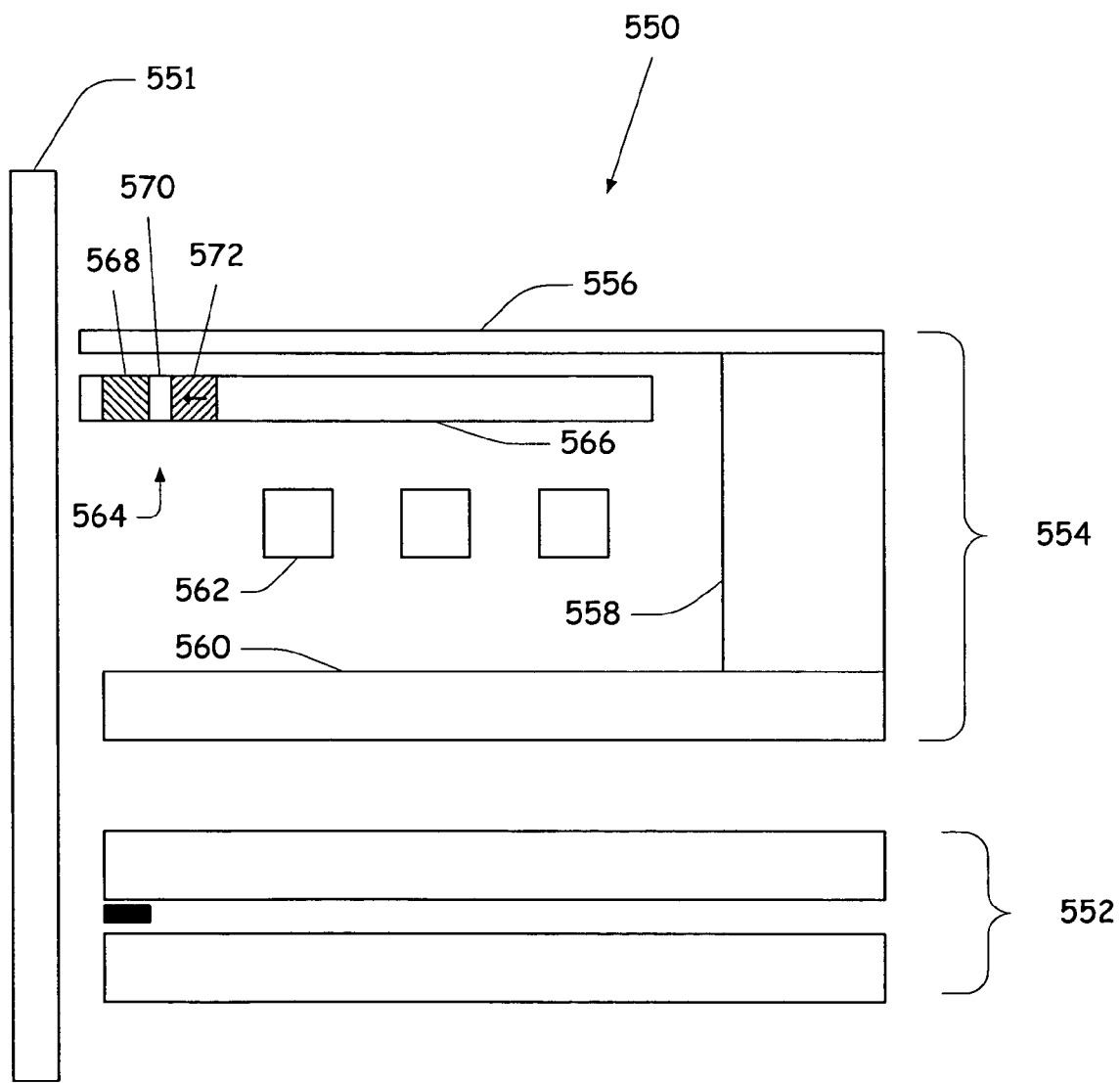
FIG. 28 is a cross-sectional view of a read/write head and an oscillator in accordance with an alternative embodiment of the present invention.
Figure 29:
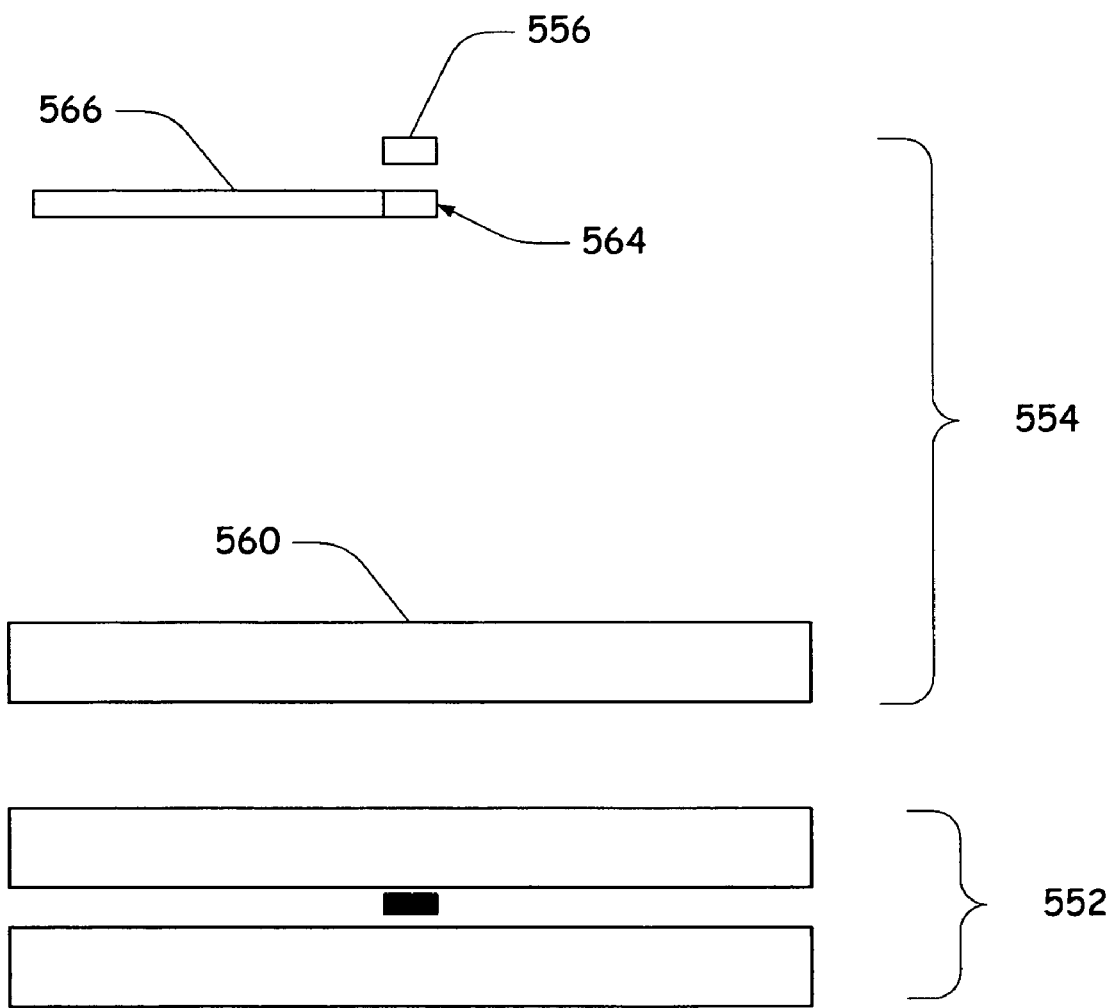
FIG. 29 is a layer diagram of an air bearing surface of the read/write head in FIG. 28.
Figure 30:
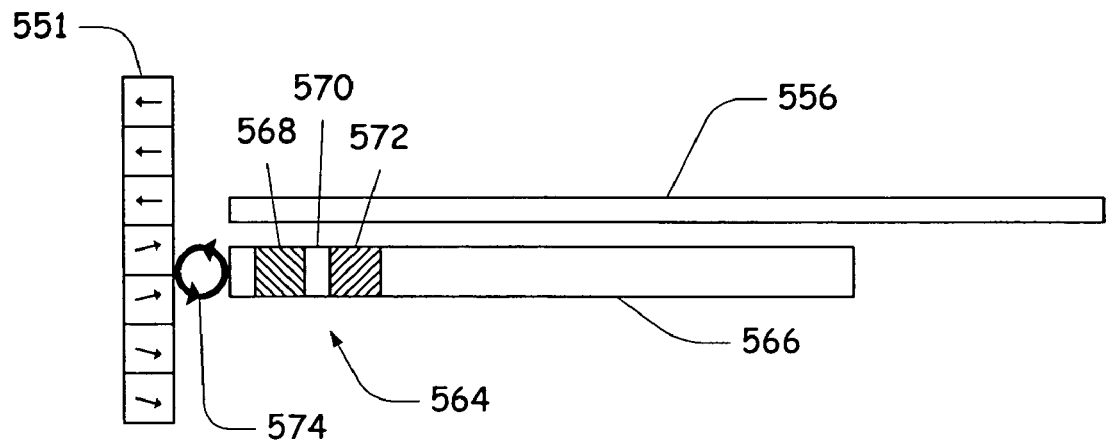
FIG. 30 is a cross-sectional view of a planar oscillator of the read/write head of FIGS. 28-29.
Figure 31:
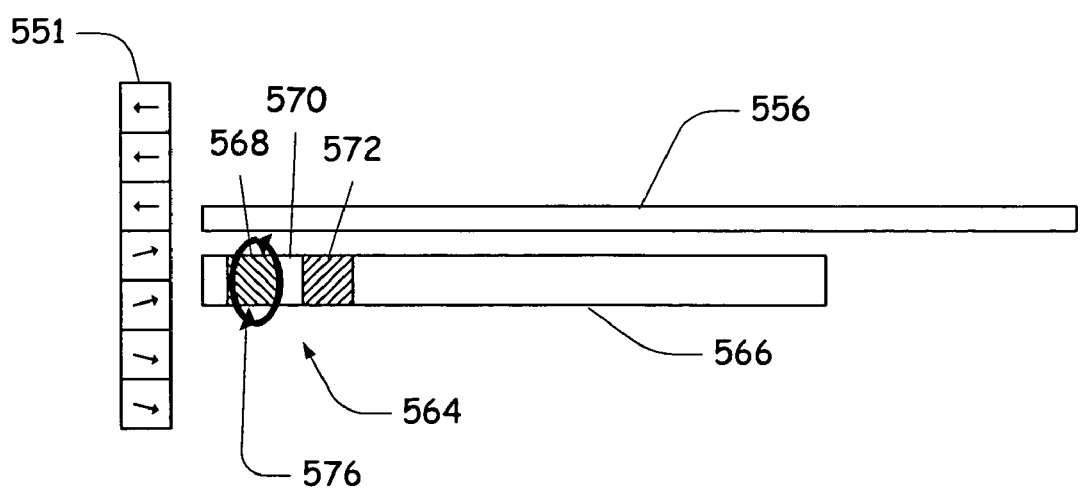
FIG. 31 is a cross-sectional view of an axial oscillator of the read/write head of FIGS. 28-29.

FIGS. 28 and 29 illustrate a horizontal style oscillator near a leading edge of a main pole. Head 550 is positioned above media 551 and includes a reader portion 552 and a writer portion 554. Writer portion 554 includes a main pole 556, closer 558, return pole 560 and coils 562. An RF oscillator 564 is coupled to a conductor 566 to provide an assist field to aid in writing to media 551. Oscillator 564 includes an oscillating layer 568, spacer 570 and polarizing layer 572. FIG. 30 shows an axial style oscillator creating a field 574. FIG. 31 shows a planar style oscillator creating a field 576.

It will be appreciated that the RF oscillator may be fabricated with various dimension (typically <100 nm) and shape (for example elliptical) in order to optimize current driven magnetization oscillations. In addition, the oscillator can be designed to optimize an effective RF field radiation pattern generated by the magnetization oscillations. This radiation pattern can be determined by the geometry of oscillator and the corresponding media.

Although the present invention has been described with reference to illustrative embodiments, those skilled in the art will recognize that changes may be made in form and detail without departing from the spirit and scope of the invention. For example, various assist structures can be used in assisting operation of a magnetic pole tip. Also, the shape and size of the magnetic pole tip, bias structures, oscillators and/or magnetic shields are variable depending on particular requirements for a read/write head. Furthermore, the designs of the read/write heads disclosed herein are applicable to various recording systems such as longitudinal recording systems and perpendicular systems.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data storage system for perpendicular recording, it will be appreciated by those skilled in the art that the teachings of the present invention can be applied to longitudinal recording, without departing from the scope and spirit of the present invention.

What is claimed is:

1. A recording head for use with a storage medium, comprising:
    a substrate having an edge;
    a magnetic pole;
    a first magnetic bias structure positioned on the edge on a first side of the magnetic pole;
    a second magnetic bias structure positioned on the edge on a second side of the magnetic pole that is opposite the first side;

spacer material positioned between the magnetic pole and the first magnetic bias structure and between the magnetic pole and the second magnetic bias structure; and a soft magnetic shield, wherein the spacer material is positioned between the magnetic pole and the soft magnetic shield.

2. The recording head of claim 1 wherein at least one of the first and second magnetic bias structures includes a seed layer, a hard magnetic film layer and a spacer layer.

3. The recording head of claim 1 wherein at least one of the first and second magnetic bias structures includes a seed layer, an anti-ferromagnetic layer and a ferromagnetic layer.

4. The recording head of claim 1 wherein the soft magnetic shield is positioned between at least one of the first and second magnetic bias structures and the magnetic pole.

5. The recording head of claim 1, wherein each of the first and second magnetic bias structures includes a surface that faces the storage medium and is proximate the air bearing surface.

6. The recording head of claim 1, wherein the first and second magnetic bias structures are adapted to orient the magnetic field of the magnetic pole in a direction that extends from the first magnetic bias structure to the second magnetic bias structure and is substantially parallel to the air bearing surface.

7. The recording head of claim 1, wherein the spacer material is non-magnetic such that the magnetic pole is magnetically decoupled from the first magnetic bias structure and the second magnetic bias structure.

8. A head, comprising:

a substrate having a trailing edge;

a magnetic pole tip coupled to the trailing edge of the substrate;

a coil adapted to orient a magnetic field of the magnetic pole tip; and an assist mechanism spaced apart from the pole tip and adapted to provide a supplemental magnetic field, wherein the assist mechanism includes an RF oscillator.

9. The head of claim 8 wherein the assist mechanism is adapted to orient the magnetic field of the magnetic pole tip to be substantially parallel to the trailing edge of the substrate.

10. The head of claim 8 wherein the assist mechanism is adapted to orient the magnetic field of the magnetic pole to be substantially perpendicular to the trailing edge of the substrate.

11. The head of claim 8, wherein the RF oscillator includes an oscillating layer and a polarizing layer.

12. The head of claim 11, wherein the RF oscillator includes a spacer positioned between the oscillating layer and the polarizing layer.

13. The head of claim 12, wherein the oscillating layer is positioned between an air bearing surface of the head and the polarizing layer.

14. The head of claim 8, wherein the RF oscillator is oriented along a plane that is substantially parallel to an air bearing surface of the head.

15. The head of claim 8, wherein the RF oscillator is oriented along a plane that is substantially perpendicular to an air bearing surface of the head.

16. A head, comprising:

a substrate having a trailing edge;

a magnetic pole tip coupled to the trailing edge of the substrate;

a coil adapted to orient a magnetic field of the magnetic pole tip; and an assist mechanism spaced apart from the pole tip and adapted to provide a supplemental magnetic field, wherein the assist mechanism is adapted to orient the magnetic field of the magnetic pole to be substantially perpendicular to the trailing edge of the substrate.

17. The head of claim 16, wherein the assist mechanism includes:

a first magnetic bias structure positioned on a first side of the magnetic pole tip; and a second magnetic bias structure positioned on a second side of the magnetic pole tip that is opposite the first side, the second side being further away from the trailing edge than the first side.

18. The head of claim 17, and further comprising a non-magnetic spacer positioned such that the first magnetic bias structure and the second magnetic bias structure are magnetically decoupled from the magnetic pole tip.

19. The head of claim 16, wherein the assist mechanism includes a bias coil.

* * * * *

UNITED STATES PATENT AND TRADEMARK OFFICE
CERTIFICATE OF CORRECTION

PATENT NO. : 7,397,633 B2 Page 1 of 1
APPLICATION NO. : 11/069792
DATED : July 8, 2008
INVENTOR(S) : Xue et al.

It is certified that error appears in the above-identified patent and that said Letters Patent is hereby corrected as shown below:

Title page, item [57]
In line 5 of the Abstract, please delete "magnetic pole, Spacer material" and replace it with --magnetic pole.  Spacer material--

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,397,633 B2 Page 1 of 1
APPLICATION NO. : 11/069792
DATED : July 8, 2008
INVENTOR(S) : Xue et al.

It is certified that error appears in the above-identified patent and that said Letters Patent is hereby corrected as shown below:

Title page, item [75] Inventors, delete "Nural Amin" and insert --Nurul Amin--

Signed and Sealed this

Twenty-fifth Day of November, 2008

JON W. DUDAS
*Director of the United States Patent and Trademark Office*